United States Patent
Sarin et al.

(10) Patent No.: US 9,230,096 B2
(45) Date of Patent: Jan. 5, 2016

(54) SYSTEM AND METHOD FOR DATA LOSS PREVENTION IN A VIRTUALIZED ENVIRONMENT

(75) Inventors: Sumit Sarin, Pune (IN); Sumesh Jaiswal, Pune (IN)

(73) Assignee: Symantec Corporation, Mountain View, CA (US)

( * ) Notice: Subject to any disclaimer, the term of this patent is extended or adjusted under 35 U.S.C. 154(b) by 625 days.

(21) Appl. No.: 13/539,848

(22) Filed: Jul. 2, 2012

(65) Prior Publication Data

US 2014/0007181 A1  Jan. 2, 2014

(51) Int. Cl.
| | |
|---|---|
| G06F 21/24 | (2006.01) |
| G06F 21/50 | (2013.01) |
| G06F 21/53 | (2013.01) |
| G06F 21/55 | (2013.01) |

(52) U.S. Cl.
CPC .............. *G06F 21/50* (2013.01); *G06F 21/53* (2013.01); *G06F 21/55* (2013.01); *G06F 21/556* (2013.01); *G06F 2221/2101* (2013.01); *G06F 2221/2149* (2013.01)

(58) Field of Classification Search
CPC ......... G06F 21/50; G06F 21/55; G06F 21/53; G06F 21/556; G06F 2221/2149; G06F 2221/2102
See application file for complete search history.

(56) References Cited

U.S. PATENT DOCUMENTS

| | | | | |
|---|---|---|---|---|
| 6,971,018 B1 * | 11/2005 | Witt et al. | ...................... | 713/187 |
| 7,185,238 B2 * | 2/2007 | Wedel et al. | ................... | 714/100 |
| 7,991,747 B1 * | 8/2011 | Upadhyay et al. | ............ | 707/674 |
| 8,037,537 B1 | 10/2011 | Sharma et al. | | |
| 8,108,935 B1 | 1/2012 | Sobel et al. | | |
| 8,347,380 B1 | 1/2013 | Satish et al. | | |
| 8,495,631 B2 | 7/2013 | Waldspurger et al. | | |
| 8,495,705 B1 * | 7/2013 | Verma et al. | ...................... | 726/2 |
| 8,549,643 B1 * | 10/2013 | Shou | ............................... | 726/23 |
| 8,726,396 B1 * | 5/2014 | Dodke | ............................. | 726/26 |
| 8,832,780 B1 * | 9/2014 | Sarin et al. | ......................... | 726/1 |
| 8,950,005 B1 * | 2/2015 | Torney | ............................. | 726/29 |
| 9,003,475 B1 * | 4/2015 | Jaiswal et al. | ..................... | 726/1 |
| 2004/0025166 A1 | 2/2004 | Adlung et al. | | |
| 2005/0060537 A1 | 3/2005 | Stamos et al. | | |
| 2009/0089879 A1 | 4/2009 | Wang et al. | | |
| 2009/0241109 A1 * | 9/2009 | Vandegrift et al. | ............... | 718/1 |
| 2009/0265756 A1 | 10/2009 | Zhang et al. | | |
| 2010/0049930 A1 * | 2/2010 | Pershin et al. | ................ | 711/162 |
| 2010/0269171 A1 * | 10/2010 | Raz et al. | ......................... | 726/13 |

(Continued)

OTHER PUBLICATIONS

Zhao, "Towards Protecting Sensitive Files in a Comprimised System," Proceedings of the Third IEEE International Security in Storage Workshop, 2005, pp. 1-8.*

(Continued)

*Primary Examiner* — Kaveh A Brishamkar
*Assistant Examiner* — James J Wilcox
(74) *Attorney, Agent, or Firm* — Lowenstein Sandler, LLP (57) ABSTRACT

A data loss prevention (DLP) manager running on a security virtual machine manages DLP policies for a plurality of guest virtual machines. The DLP manager identifies a startup event of a guest virtual machine, and installs a DLP component in the guest virtual machine. The DLP component communicates with the DLP manager operating within the security virtual machine. The DLP manager also receives file system events from the DLP component, and enforces a response rule associated with the guest virtual machine if the file system event violates a DLP policy.

17 Claims, 7 Drawing Sheets

(56) References Cited

U.S. PATENT DOCUMENTS

| | | | |
|---|---|---|---|
| 2010/0275204 | A1 | 10/2010 | Kamura et al. |
| 2011/0113467 | A1* | 5/2011 | Agarwal et al. ................... 726/1 |
| 2012/0054744 | A1 | 3/2012 | Singh et al. |
| 2012/0151551 | A1* | 6/2012 | Readshaw et al. ................ 726/1 |
| 2012/0159565 | A1 | 6/2012 | Bray et al. |
| 2012/0278571 | A1* | 11/2012 | Fleming et al. ............... 711/162 |
| 2014/0007181 | A1 | 1/2014 | Sarin et al. |
| 2014/0194094 | A1* | 7/2014 | Ahuja et al. ................... 455/410 |
| 2014/0237537 | A1* | 8/2014 | Manmohan et al. .............. 726/1 |

OTHER PUBLICATIONS

Trend Micro, "Trend Micro Data Loss Prevention, Comprehensive Endpoint Protection," Installation Guide, Nov. 2010, pp. 1-48.*

Trend Micro, "Trend Micro Data Loss Prevention, Comprehensive Endpoint Protection," Administrator's Guide, Nov. 2010, pp. 1-206.*

PCT International Search Report for International Application No. PCT/US2013/049159. 4 pages.

Zhao et al., "Towards Protecting Sensitive Files in a Compromised System," IEEE, 2005.

Bryan D. Payne et al., "Lares: An Architecture for Secure Active Monitoring Using Virtualization," IEEE Symposium on Security and Privacy, School of Computer Science, Georgia Institute of Technology, 16 pages, 2008.

International Search Report and Written Opinion of the International Searching Authority for International Application No. PCT/US2014/016131 mailed May 15, 2014, 10 pages.

No Author, Lumension® to Showcase Application Control Benefits in Virtual Environments at VMworld® 2011, Lumension Security, Inc. Press Release, Aug. 29, 2011, 2 pages, World Wide Web, https://www.lumension.com/Press---Events/Press-Releases/Lumension%C2%AE-To-Showcase-Application-Control-Benefit.aspx.

Office Action for U.S. Appl. No. 13/770,032 mailed Sep. 10, 2014.

* cited by examiner

SYSTEM AND METHOD FOR DATA LOSS PREVENTION IN A VIRTUALIZED ENVIRONMENT

TECHNICAL FIELD

The embodiments of the disclosure relate generally to virtual machine systems and, more specifically, relate to data loss prevention in a virtualized environment.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Data Loss Prevention (DLP) in a virtual machine environment requires an agent to be installed on each virtual machine to prevent loss of sensitive data through removable devices (i.e., USB drives, CD/DVD), and network shares. However, ensuring that every VM that gets created has an up-to-date DLP agent is a challenge and an inefficient use of system resources.

BRIEF DESCRIPTION OF THE DRAWINGS

Embodiments of the present disclosure are illustrated by way of example, and not by way of limitation, and can be more fully understood with reference to the following detailed description when considered in connection with the figures in which.

DETAILED DESCRIPTION

Described herein are methods and systems for data loss prevention (DLP) in virtual machines. Embodiments of the present disclosure provide a DLP manager running on a security virtual machine that manages DLP policies for a plurality of guest virtual machines. The DLP manager identifies a startup event of a guest virtual machine, and installs a DLP component in the guest virtual machine. In one embodiment, the DLP manager installs a DLP component in the guest virtual machine before any other applications are launched on the guest virtual machine. The DLP component communicates with the DLP manager operating within the security virtual machine. The DLP manager also receives file system events from the DLP component, and enforces one or more response rules associated with the guest virtual machine if the file system event violates a DLP policy.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions, which follow, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Figure 1:
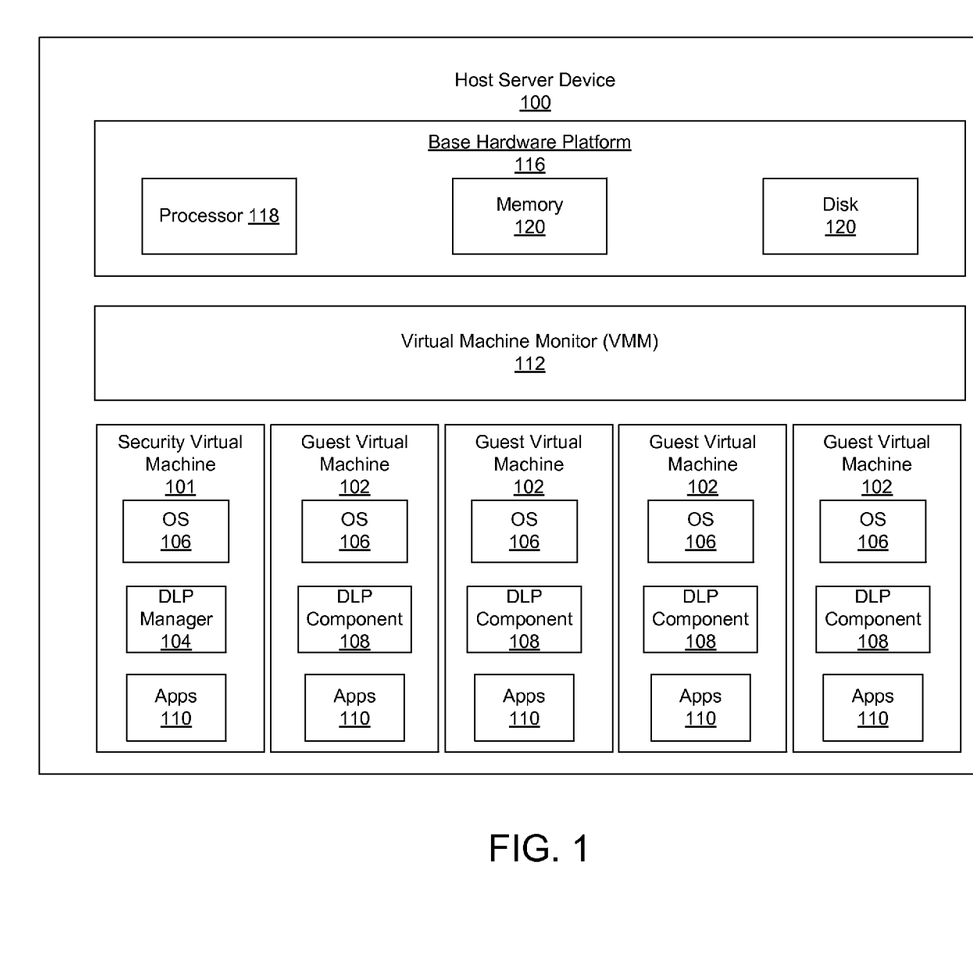
FIG. 1 illustrates one embodiment of a virtual machine (VM) host server device, which employs a dedicated security virtual machine and a Data Loss Protection (DLP) manager to perform data loss protection.

FIG. 1 illustrates one embodiment of a virtual machine (VM) host server device 100, which employs a dedicated security virtual machine 101 and a Data Loss Protection (DLP) manager 104 to perform data loss protection. As illustrated, base platform hardware 116 comprises a computing platform, which may be capable, for example, of executing an operating system (OS) or a virtual-machine monitor (VMM), such as VMM 112. In some embodiments, base hardware platform 116 may include a processor 118, memory devices 120, network devices, drivers, and so on. The VMM 112 virtualizes the physical resources of the base hardware platform 116 for one or more guest VMs 102 that are hosted by the server device 100 having the base hardware platform 116. In some embodiments, the VMM 112 may also be referred to as a hypervisor, a kernel-based hypervisor (e.g., Kernel-based VM (KVM)), or a host OS. In one embodiment, each VM 102 includes a guest operating system (OS), such as guest OS 106 and various guest software applications 110.

The DLP manager 104 identifies, monitors, and protects data in use (e.g., endpoint actions), data in motion (e.g., network actions), and data at rest (e.g., data storage). Such data may be in the form of files, messages, web requests or the like. Typically, a DLP system monitors various files, messages, etc. to determine whether they constitute use-restricted documents or objects. A use-restricted document represents a document that cannot be freely distributed or manipulated due to its sensitive nature. Use-restricted documents may be marked with such words as "confidential," "sensitive," "stock," etc. to indicate their sensitive nature. In addition, use-restricted documents may include confidential information such as customer, employee, or patient personal information, pricing data, design plans, source code, CAD drawings, financial reports, etc.

The DLP manager 104 may determine whether a file or a message is a use-restricted document by applying a DLP policy. A DLP policy may specify what data should be present in a file or message to be classified as a use-restricted document. For example, a DLP policy may specify one or more keywords (e.g., "confidential," "sensitive," "stock," names of specific diseases (e.g., "cancer," "HIV," etc.), etc.) for searching various files, messages and the like. Additionally, the DLP Policy may specify other methods for identifying policy violations including, but not limited to, exact data matching (EDM), indexed document matching (IDM), and vector machine learning (VML). DLP policies will be discussed in greater detail below with reference to FIG. 3.

Instead of a typical DLP system, where each virtual machine would include a DLP agent, FIG. 1 illustrates that the DLP manager 104 operates within a dedicated security VM (SVM) 101 and communicates with DLP components 108 operating on the guest VMs 102. In another embodiment, the DLP manager 104 may operate within the VMM 112 or other hypervisor process. The DLP manager 104 communicates across a virtual communication channel with a DLP component 108 operating within each of the guest VMs 102. The virtual communication channel, in one embodiment, is a virtual network where each VM 101, 102 may communicate using standard networking protocols, or proprietary networking protocols over an isolated virtual network dedicated to security functions. In another embodiment, the virtual communication channel is a virtualized communication bus coupling each of the VMs 101, 102 with the VMM 112. The DLP component 108 may be configured as part of the operating system 106, or alternatively, an embedded process of the virtualized hardware of the guest virtual machine 102. The DLP manager 104 and DLP component 108 will be discussed below in greater detail with reference to FIGS. 2 and 3.

Figure 2:
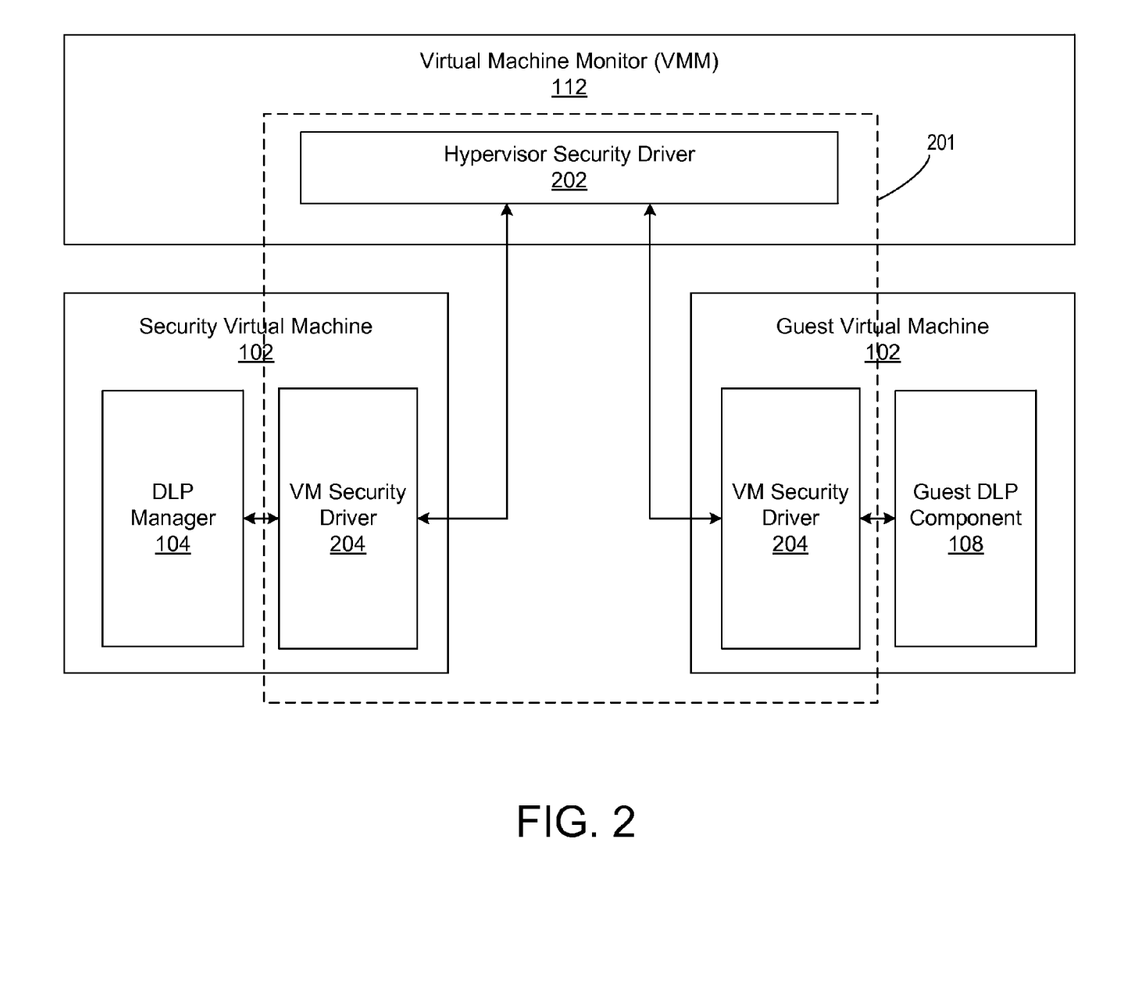
FIG. 2 illustrates one embodiment of a DLP manager and a DLP component operating in a virtual machine environment.

FIG. 2 illustrates one embodiment of a DLP manager 104 and a DLP component 108 operating in a virtual machine environment under embodiments of the present invention. In the depicted embodiment, the DLP manager 104 and the DLP component 108 are configured to operate in concert with a DLP system 201 that includes a hypervisor security driver 202 and VM security drivers 204. One example of a virtual machine DLP system suitable for use with the present disclosure is the VMware vShield™ framework developed by VMware® of Palo Alto, Calif. Alternatively, and as described above, the DLP manager 104 and the DLP component 108 may be configured to operate independently of a virtual machine DLP system 201.

The hypervisor security driver 202 may be implemented as a process operating on the VMM 112 and may be configured to communicating with a plurality of guest virtual machines 102, although only one is depicted here in FIG. 2 for clarity. The DLP manager 104, in one embodiment, communicates with each guest DLP component 108 via the DLP system 201. The DLP manager 104 is configured to receive notifications from the DLP component 108 that are indicative of virtual machine and file system activity events. Examples of virtual machine events include, but are not limited to, VM power on events, shutdown events, migration and reconfiguration events. Examples of file system events include, but are not limited to, file open events, file close (e.g., save) events, file read/write, copy/paste events, move file events, and file deletion events.

When the guest VM 102 is powered on, the DLP manager 104 is configured to intercept the power on event of the VM 102, identify the VM 102, and maintain identity information of the VM 102, as will be described in greater detail below with reference to FIG. 3. In one embodiment, the DLP manager 104 identifies the VM 102 by identifying the operating system and/or roles (e.g., file server, email server, desktop, etc.) of the VM 102. In a further embodiment, the DLP manager 104 identifies a hash value of a kernel of the operating system, for example. In another example, the DLP manager 104 identifies the VM 102 by name specified in the VMM 112. One of skill in the art will recognize that there are many different methods for uniquely identifying a VM 102 that may be used in accordance with embodiments of the present disclosure.

The DLP component 108 is configured to communicate with the DLP manager 104 file system events. For example, when a user initiates a file system event within the guest VM 102, the DLP component 108 intercepts the file system event and analyzes the event to determine the type of file system event (e.g., open, close, move, copy, read, write, delete, etc.) and transmits this information to the DLP manager 104. The information collected by the DLP component 108 and communicated with the DLP manager 104 may also comprise file or object information including, but not limited to, source, destination, file type (e.g., document, spreadsheet, media object, etc.), and file classification (e.g., personal, corporate, confidential, etc.). In some embodiments the information collected by the DLP component 108 and communicated with the DLP Manager 104 may include the application and the user initiating the file system event. The DLP component 108 is also configured, in one embodiment, with a DLP user interface for receiving from a user a justification for in the event where the DLP manager 104 identifies the user has violated a DLP policy.

Figure 3:
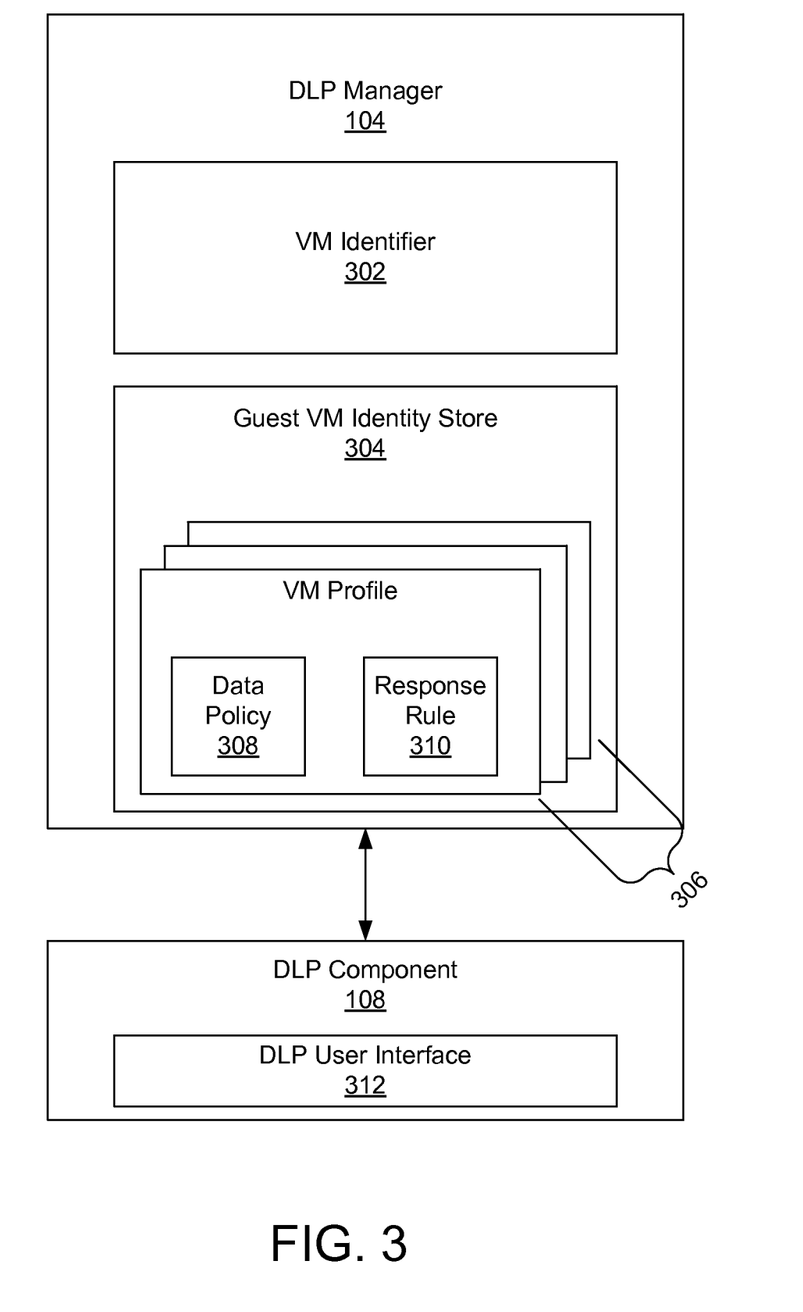
FIG. 3 illustrates one embodiment of the DLP manager and DLP component.

FIG. 3 illustrates one embodiment of the DLP manager 104 and DLP component 108 under embodiments of the present invention. In one embodiment, the DLP manager 104 includes a VM identifier 302 and a VM identity repository 304. The VM identifier 302 uniquely identifies guest virtual machines as described above with reference to FIG. 2. The DLP manager 104 is configured to determine if an identified guest virtual machine has a DLP security profile 306 associated with the guest virtual machine stored in the repository 304. The repository 304 maintains a plurality of profiles 306, one profile 306 for each virtual machine, or, one profile 306 for multiple virtual machines. Each of the profiles 306 may include a data policy 308 and a response rule 310 for when the data policy 308 is violated.

The DLP policies 308 specify rules for monitoring content to detect presence of confidential information. For example, a DLP policy 308 rule may specify one or more keywords (e.g., "confidential," "sensitive," "stock," names of specific diseases (e.g., "cancer," "HIV," etc.), etc.) for searching various files, messages and the like. In addition to keywords, a DLP policy 308 may include other rules for detecting presence of confidential data in information content being monitored. For example, in a financial organization, a DLP policy 308 may specify that if a message contains the word "confidential," further search of the message should be performed to determine whether the message includes customer data (e.g., a social security number, first name, last name, etc.) or other sensitive information (e.g., financial reports, source code, etc.). The response rule 310 specifies what actions should be taken when a policy violation is detected. For example, a response rule 310 may require that a message containing confidential data be blocked, re-routed, reported, quarantined, encrypted, etc.

In one embodiment, the DLP policy 308 includes rules for exact data matching (EDM) and/or a indexed document matching (IDM). Exact data matching (EDM) may be used for protecting data that is typically in structured formats, such as database records. Indexed document matching (IDM) may be used to protect unstructured data, such as Microsoft® Word or PowerPoint® documents, or CAD drawings. For both EDM and IDM, sensitive data is first identified. The DLP manager 104 then fingerprints the sensitive data for precise, ongoing detection. In one embodiment, the fingerprinting process includes accessing and extracting text and data, normalizing it, and securing it using a nonreversible hash. When a file or other data is to be scanned, a fingerprint (e.g., hash) is generated of that file or contents of that file and compared to stored fingerprints. If a match is found, then the scanned file is identified as containing sensitive data.

In one embodiment, the DLP policy 3038 includes a vector machine learning (VML) profile. Vector machine learning may be used to protect sensitive unstructured data. For VML, a training data set including a set of sensitive data and a set of non-sensitive data is provided to the DLP Manager 104. The DLP manager 104 analyzes the training data set using vector machine learning to generate a classification model and a feature set, which are added to the VM security profile 306 along with the training data set. The classification model is a statistical model for data classification that includes a map of support vectors that represent boundary features. The feature set is a data structure such as a list or table that includes multiple features (e.g., words) extracted from the training data set. The DLP manager 104 is configured to process the profile 306 and input unclassified data to classify the data as sensitive or non-sensitive (or to classify the data as personal data or corporate data).

The DLP manager 104 may create a default policy for every VM detected, or may customize a VM profile 306 depending upon the role of the virtual machine. Additionally, the DLP manager 104 is configured to receive customized VM profiles 306 for various users who log onto the VM, other DLP managers 104, or hypervisor security devices.

DLP policies 308 are provided to the DLP manager 104 that in turn performs content monitoring to detect policy violations across the VMs 102. In another embodiment, the DLP manager 104 is configured to communicate the VM profile 306 (e.g DLP configuration) that is associated with a specific VM 102 and DLP component. The DLP component 108 is configured to determine if the DLP policy requires monitoring of the source device which may include data in motion such as incoming and outgoing messages or web requests transported using various protocols (e.g., simple mail transfer protocol (SMTP), hypertext transfer protocol (HTTP), file transfer protocol (FTP), AOL Instant Messaging (AIM), ICQ, single object access protocol (SOAP), SQLNet, transmission control protocol/Internet protocol (TCP/IP), user datagram protocol (UDP), Ethernet, 802.11, etc.). If the DLP component 108 identifies that the source device requires monitoring, the DLP component 108 transmits a notification to the DLP manager 104. The DLP manager 104 may analyze the data associated with the file and create a record identifying the content, the relevant DLP policy 308, and a user associated with the violation, if the data violates policy 308. In addition, the DLP manager 104 may be configured to remotely take other actions required by the response rules 310. In another embodiment, the DLP component 108 locally performs these actions required by the response rules 310.

The DLP component 108, in one embodiment, may also be configured to analyze fingerprints of the source data instead of the actual source data, to avoid exposing the confidential information and to facilitate more efficient searching of the content. Fingerprints may include hashes of source data, encrypted source data, or any other signatures uniquely identifying the source data. The DLP component 108 may then report DLP policy violation(s) to the DLP manager 104, and/or may perform other necessary actions (e.g., blocking or rerouting the relevant content). Alternatively, the DLP manager 104 may be configured to remotely perform the monitoring and analyzing of data.

Figure 4:
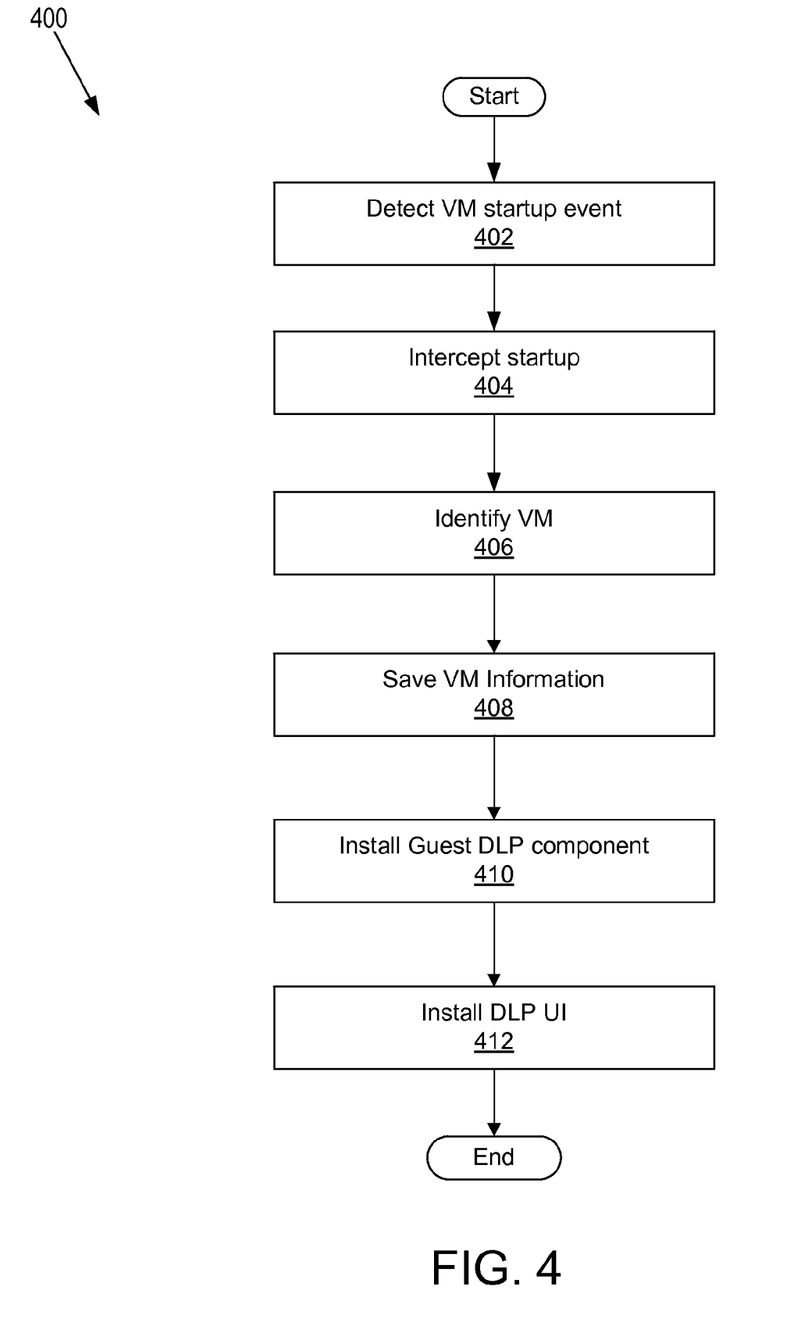
FIG. 4 illustrates a flow diagram of one embodiment of a method for implementing a DLP manager.
Figure 5:
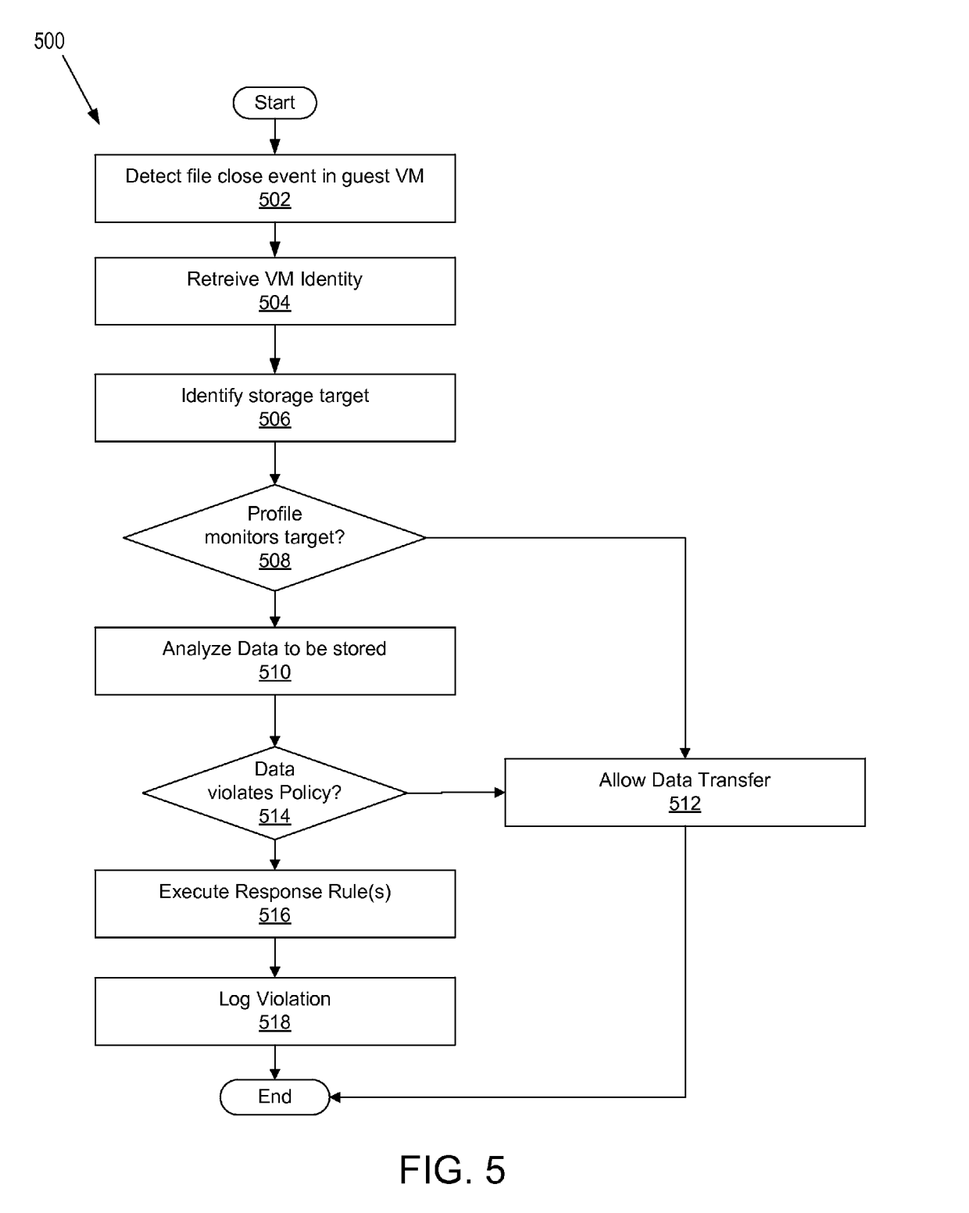
FIG. 5 illustrates a flowchart diagram of a method for monitoring file system events according to one embodiment.
Figure 6:
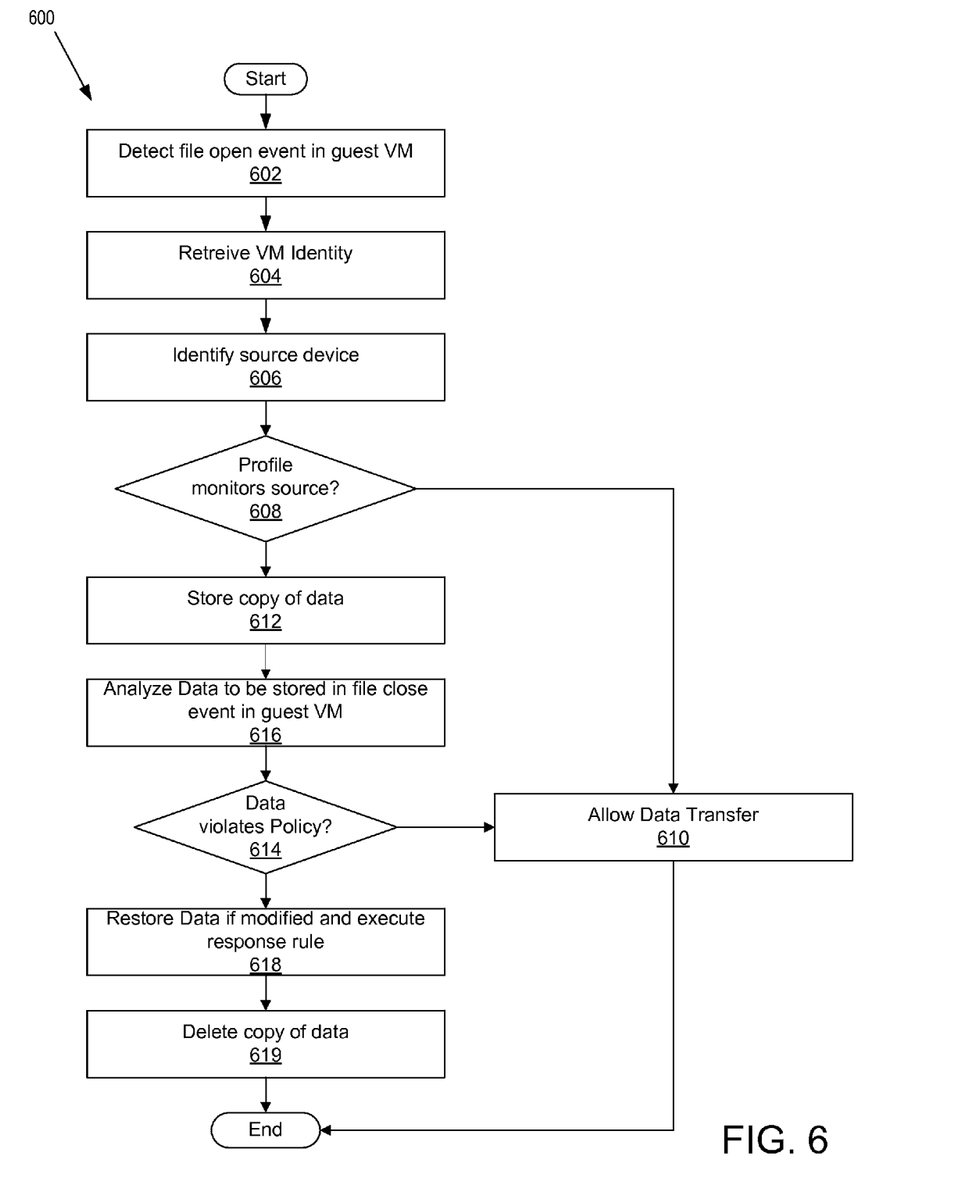
FIG. 6 illustrates a flowchart diagram of a method for another embodiment of monitoring a file system event.

FIGS. 4-6 are flowchart and/or block diagram illustrations of methods, systems, and computer program products according to an embodiment of the disclosure. It will be understood that each block of the flowchart and/or block diagram illustrations, and combinations of blocks in the flowchart and/or block diagram illustrations, may be implemented by processing logic. The processing logic may comprise hardware (circuitry, dedicated logic, etc.), software (such as is run on a general-purpose computer system or a dedicated machine), or a combination of both. These software instructions, or other computer program instructions, may be provided to a processor of a general purpose computer, special purpose computer, or other programmable data processing apparatus to produce the processing logic, such that the instructions, which execute via the processor of a computer or other programmable data processing apparatus, implement the functions specified in the flowchart and/or block diagram block or blocks.

FIG. 4 illustrates a flow diagram of one embodiment of a method 400 for implementing a DLP manager 104 under embodiments of the present invention. The method starts and the processing logic, at block 402, detects a virtual machine startup event. In one embodiment, the processing logic is configured to capture a startup event by identifying a virtual machine that has requested computing resources from a hypervisor. The processing logic then, at block 404, intercepts the startup request and identifies, at block 406, the virtual machine. The processing logic is configured to identify the virtual machine by analyzing the characteristics of the virtual machine. These characteristics can include, but are not limited to, resources requested by the virtual machine, the type of operating system of the virtual machine, the operating role of the virtual machine (e.g., file server, email server, database server, etc.), and/or a fingerprint of the operating system or kernel, or the name of the virtual machine as specified in the VMM or name of the business unit to which the virtual machine belongs.

At block 408, the processing logic saves the virtual machine information to the repository 304. In one embodiment, the processing logic determines if the virtual machine information already exists as a virtual machine profile 306. If a virtual machine profile 306 does not exist for the identified virtual machine, the processing logic is configured to create a new virtual machine profile 306 with a default DLP policy 308 and response rule 310. In another embodiment, the processing logic retrieves a virtual machine profile 306 from, for example, the hypervisor security driver 202 of FIG. 2.

At block 410, the processing logic remotely installs the DLP component in the identified virtual machine. The processing logic is configured to install the DLP component by pushing and automatically installing the DLP component. At block 412, the processing logic optionally installs a user interface configured to notify a user of DLP policy violations. In one embodiment, the user interface presents a visual or aural message to the user. Alternatively, the user interface may transmit a message (e.g., email) to the user. The method 400 then ends.

FIG. 5 illustrates a flowchart diagram of a method 500 for monitoring file system events under embodiments of the present invention. The method begins and processing logic, at block 502, detects a "file close" event in the guest virtual machine. In one embodiment, the processing logic receives a notification from, for example, a DLP component 108 of the virtual machine 102 that indicates a user is closing a file. The processing logic, at block 504, retrieves the VM identity profile 306 from the repository 304 (see FIG. 3) that matches the VM that initiated the file close event.

At block 506, the processing logic identifies the storage target associated with the file close event. For example, the processing logic is configured to determine if the storage target device is a removable device, removable medium, network share, etc. If the DLP policy 308 requires monitoring of the storage target device, the processing logic, at block 510, is configured to analyze the data the user is requesting to be stored on the target device. If the DLP policy 308 does not require monitoring of the storage target device, the processing logic, at block 512, allows the data transfer.

At block 514, the processing logic determines if the analyzed data violates the DLP policy 308. For example, the DLP policy 308 rule may specify one or more keywords (e.g., "confidential," "sensitive," "stock," names of specific diseases (e.g., "cancer," "HIV," etc.), etc.) for searching various files, messages and the like. In addition to keywords, the DLP policy 308 may include other rules for detecting presence of confidential data in information content being monitored. For example, in a financial organization, a DLP policy 308 may specify that if a message contains the word "confidential," further search of the message should be performed to determine whether the message includes customer data (e.g., a social security number, first name, last name, etc.) or other sensitive information (e.g., financial reports, source code, etc.). If the analyzed data does not violate the DLP policy 308, the processing logic, at block 512, allows the data transfer.

If, however, the analyzed data does violate the DLP policy, the processing logic, at block 516, executes the response rule(s) 310 associated with the DLP policy 308. For example, the response rule 310 may require that a message containing confidential data be blocked, re-routed, reported, quarantined, encrypted, etc. The processing logic, at block 518, logs the policy violation and the actions taken in response to the policy violation. In a further embodiment, the processing logic instructs the DLP user interface to indicate to the user that the user has violated a DLP policy. For example, the DLP user interface may be configured to present a message on a screen to the user, and/or transmit a message to the user via email. The method 500 then ends.

FIG. 6 illustrates a flowchart diagram of a method 600 for another embodiment of monitoring a file system event under embodiments of the present invention. The method 600 starts and the processing logic, at block 602, detects a file creation or file open event in a guest virtual machine. The processing logic, in one embodiment, is configured to remotely monitor file system events in the virtual machine. Alternatively, the processing logic is configured to receive notification from the DLP component 108.

At block 604, the processing logic retrieves the virtual machine identity of the virtual machine associated with the file system event. The processing logic, as described above, is configured to uniquely identify the virtual machine by analyzing characteristics of the virtual machine. The characteristics may include, but are not limited to, type of operating system, types of virtual devices associated with the virtual machine, and the role of the virtual machine. In a further embodiment, the processing logic identifies a fingerprint of the operating system or kernel of the virtual machine. The processing logic is also configured to retrieve from the repository 304 a DLP profile associated with the identified virtual machine.

At block 606, the processing logic identifies the source device of the file system event. For example, the processing logic identifies if a user is attempting to open an existing file from the Internet, from an attached storage device, from a local storage drive, from a network attached storage device, etc. The processing logic then, at block 608, determines if the DLP profile 308 requires monitoring of the identified source device. If the DLP profile 308 does not require monitoring of the source device, the processing logic, at block 610, allows the file to be opened If, however, the DLP profile 308 requires monitoring of the source device, the processing logic makes a copy, at block 612, of the data in the file to be opened. In one embodiment, the processing logic may make a copy of the data in a dedicated storage area of the security VM 101 of FIG. 1. Alternatively, the processing logic may make a copy of the data in a dedicated storage area in the guest VM 102. The processing logic, at block 616, when receives a notification from the DLP component 108 of the virtual machine 102 that indicates a user is closing a file, it determines whether the modified file violates the DLP policy 308. For example, the processing logic is configured to analyze the content for words and media objects (e.g., images, audio objects, and video objects) that violate the DLP policy. If the processing logic determines the analyzed data does not violate the DLP policy 308, the processing logic allows the data transfer at block 610. If the analyzed data violate the DLP policy, the processing logic at block 618 executes the response rule(s) 310 associated with the DLP policy 308 and restores the copy of the file to its original location. The processing logic, at block 619, deletes the copy of the file and method 600 then ends.

Figure 7:
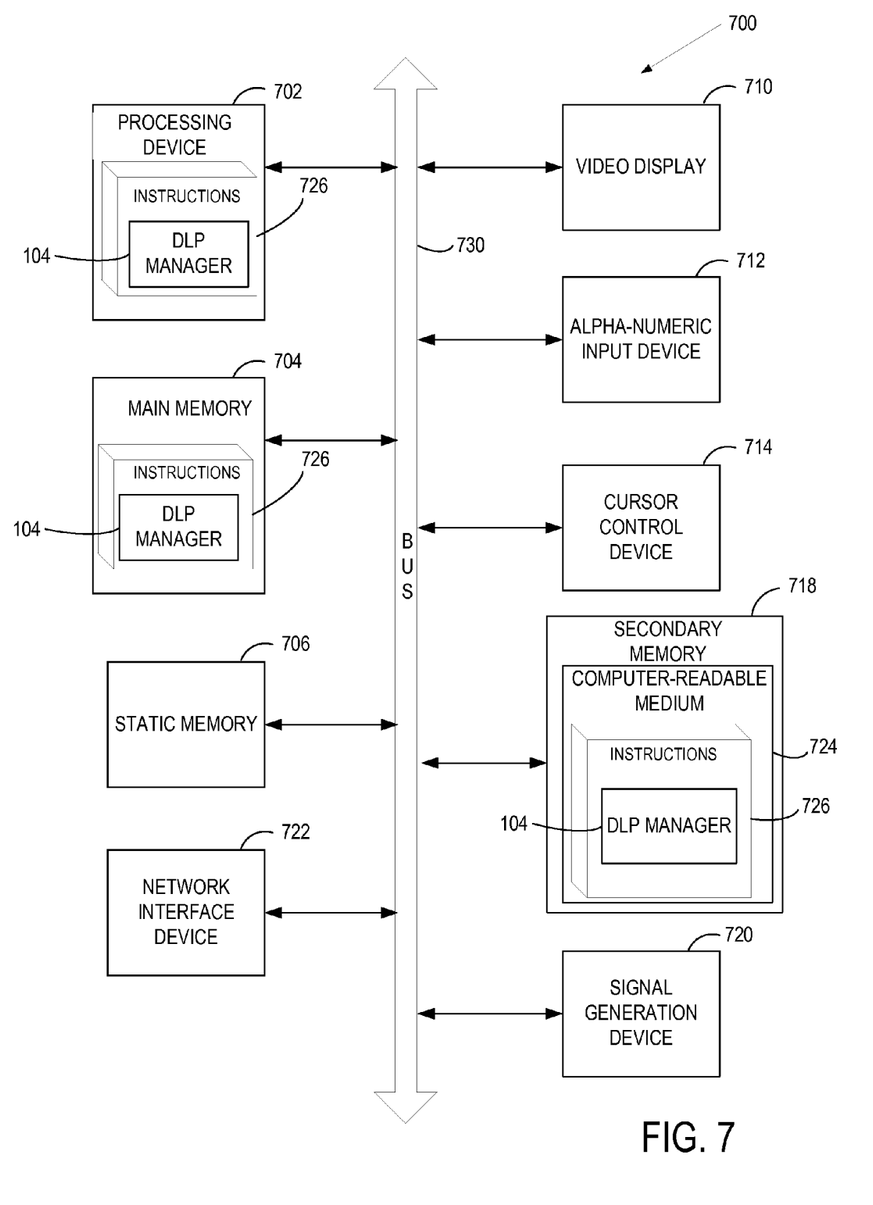
FIG. 7 is a diagram of one embodiment of a computer system for facilitating the execution of the DLP manager.

FIG. 7 is a diagram of one embodiment of a computer system for facilitating the execution of the DLP manager. Within the computer system 700 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller, or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM) or DRAM (RDRAM), etc.), a static memory 706 (e.g., flash memory, static random access memory (SRAM), etc.), and a secondary memory 718 (e.g., a data storage device in the form of a drive unit, which may include fixed or removable computer-readable storage medium), which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)) connected to the computer system through a graphics port and graphics chipset, an alphanumeric input device 712 (e.g., a keyboard), a cursor control device 714 (e.g., a mouse), and a signal generation device 720 (e.g., a speaker).

The secondary memory 718 may include a machine-readable storage medium (or more specifically a computer-readable storage medium) 724 on which is stored one or more sets of instructions 726 embodying any one or more of the methodologies or functions described herein. In one embodiment, the instructions 726 include instructions for the DLP manager 104. The instructions 726 may also reside, completely or at least partially, within the main memory 704 and/or within the processing device 702 during execution thereof by the computer system 700, the main memory 704 and the processing device 702 also constituting machine-readable storage media.

The computer-readable storage medium 724 may also be used to store the instructions 726 persistently. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 726, components and other features described herein can be implemented as discrete hardware components or integrated in the functionality of hardware components such as ASICS, FPGAs, DSPs or similar devices. In addition, the instructions 726 can be implemented as firmware or functional circuitry within hardware devices. Further, the instructions 726 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description, which follows, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "providing," "generating," "installing," "monitoring," "enforcing," "receiving," "logging," "intercepting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

We claim:

1. A method comprising:
   identifying, by a data loss prevention (DLP) manager, a startup event of a guest virtual machine, wherein the DLP manager is in a security virtual machine;
   installing, by the DLP manager, a DLP component in the guest virtual machine, the DLP component to communicate with the DLP manager;
   receiving, by the DLP manager, a file system event that is intercepted by the DLP component and that is initiated within the guest virtual machine, wherein the file system event comprises a file in at least one of a write event, a copy event, a paste event, a move event, or a deletion event, and wherein the file is not stored in the security virtual machine;
   retrieving, by the DLP manager, a DLP profile associated with the guest virtual machine from a profile repository, the DLP profile comprising a DLP policy and a response rule;
   identifying, by the DLP manager, a device associated with the file system event;
   determining, by the DLP manager, that the DLP profile requires monitoring of the identified device;
   monitoring, by the DLP manager, data associated with the file system event that is to be stored on the identified device; and
   enforcing, by the DLP manager, the response rule associated with the file system event initiated within the guest virtual machine when the file system event violates the DLP policy.

2. The method of claim 1, further comprising installing a DLP user interface in the guest virtual machine to notify a user of DLP violations.

3. The method of claim 1, further comprising:
   identifying a file close event;
   identifying a storage target associated with the file close event;
   determining when the DLP policy requires monitoring of the storage target;
   analyzing data associated with the file close event to determine whether the data violates the DLP policy; and
   executing the response rule associated with the DLP policy when the data violates the DLP policy.

4. The method of claim 3, further comprising logging a DLP policy violation when the data violates the DLP policy.

5. The method of claim 1, further comprising:
   identifying a file open event;
   identifying a source device associated with the file open event;
   determining when the DLP policy requires monitoring of the source device;
   storing a copy of the file; and
   restoring the copy of the file in the open event when the data violates the DLP policy.

6. The method of claim 5, further comprising logging a DLP policy violation when the data violates the DLP policy.

7. A non-transitory computer readable storage medium including instructions that, when executed by a processing device, cause the processing device to perform a operations comprising:
   identifying, by a data loss prevention (DLP) manager, a startup event of a guest virtual machine, wherein the DLP manager is in a security virtual machine;
   installing, by the DLP manager, a DLP component in the guest virtual machine, the DLP component to communicate with the DLP manager;
   receiving, by the DLP manger, a file system event that is intercepted by the DLP component and that is initiated within the guest virtual machine, wherein the file system event comprises a file in at least one of a write event, a copy event, a paste event, a move event, or a deletion event, and wherein the file is not stored in the security virtual machine;
   retrieving, by the DLP manager, a DLP profile associated with the guest virtual machine from a profile repository, the DLP profile comprising a DLP policy and a response rule;
   identifying, by the DLP manager, a device associated with the file system event;
   determining, by the DLP manager, that the DLP profile requires monitoring of the identified device;
   monitoring, by the DLP manager, data associated with the file system event that is to be stored on the identified device; and
   enforcing, by the DLP manager, the response rule associated with the file system event initiated within the guest virtual machine when the file system event violates the DLP policy.

8. The computer readable storage medium of claim 7, wherein the operations further comprise installing a DLP user interface in the guest virtual machine to notify a user of DLP violations.

9. The computer readable storage medium of claim 7, wherein the operations further comprise:
   identifying a file close event;
   identifying a storage target associated with the file close event;
   determining when the DLP policy requires monitoring of the storage target;
   analyzing data associated with the file close event to determine whether the data violates the DLP policy; and
   executing the response rule associated with the DLP policy when the data violates the DLP policy.

10. The computer readable storage medium of claim 9, wherein the operations further comprise logging the DLP policy violation.

11. The computer readable storage medium of claim 7, wherein the operations further comprise:
    identifying a file open event;

identifying a source device associated with the file open event;

determining when the DLP policy requires monitoring of the source device;

storing a copy of the file; and restoring the copy in the open event when the data violates the DLP policy.

12. The computer readable storage medium of claim 11, wherein the operations further comprise logging a DLP policy violation when the data violates the DLP policy.

13. An apparatus comprising:
a memory to store instructions for a data loss prevention (DLP) manager, wherein the DLP manager is in a security virtual machine; and a computing device, coupled to the memory, wherein the computing device is to execute the DLP manager:

identify a startup event of a guest virtual machine;

install a DLP component in the guest virtual machine, the DLP component to communicate with the DLP manager;

receive, by the DLP manager, a file system event that is intercepted by the DLP component and that is initiated within the guest virtual machine, wherein the file system event comprises a file in at least one of a write event, a copy event, a paste event, a move event, or a deletion event, and wherein the file is not stored in the security virtual machine;

retrieve a DLP profile associated with the guest virtual machine from a profile repository, the DLP profile comprising a DLP policy and a response rule;

identify a device associated with the file system event;

determining that the DLP profile requires monitoring of the identified device;

monitoring data associated with the file system event that is to be stored on the identified device; and enforce the response rule associated with the file system event initiated within the guest virtual machine when the file system event violates the DLP policy.

14. The apparatus of claim 13, wherein the DLP manager is further to install a DLP user interface in the guest virtual machine to notify a user of DLP violations.

15. The apparatus of claim 13, wherein the DLP manager is further to:

identify a file close event;

identify a storage target associated with the file close event;

determine when the DLP policy requires monitoring of the storage target;

analyze data associated with the file close event to determine whether the data violates the DLP policy; and execute the response rule associated with the DLP policy when the data violates the DLP policy.

16. The apparatus of claim 13, wherein the DLP manager is further to log a DLP policy violation when the data violates the DLP policy.

17. The apparatus of claim 13, wherein the DLP manager is further to:

identify a file open event;

identify a source device associated with the file open event;

determine when the DLP policy requires monitoring of the source device;

store a copy of the file; and restore the copy of the file in the open event when the data violates the DLP policy.

* * * * *